United States Patent [19]

Skinner

[11] Patent Number: 5,749,998
[45] Date of Patent: May 12, 1998

[54] ASSEMBLY OF CORRUGATED PANELS INTO A WEB

[76] Inventor: Larkin P. Skinner, P.O. Box 162841, Austin, Tex. 78716

[21] Appl. No.: 438,848

[22] Filed: May 11, 1995

Related U.S. Application Data

[63] Continuation-in-part of Ser. No. 31,669, Mar. 15, 1993, Pat. No. 5,413,662.
[51] Int. Cl.$^6$ .................. B32B 31/10; B32B 31/12; B32B 31/20
[52] U.S. Cl. ............... 156/265; 156/192; 156/252; 156/264; 156/299; 156/302
[58] Field of Search .................. 156/60, 94, 250, 156/263, 264, 265, 266, 269, 299, 300, 512, 517, 556, 558, 559, 560, 561, 192, 252, 302; 428/184, 186, 903.3, 59; 52/783.11, 783.14, 783.18, 783.19; 108/51.3; 206/386; 220/441

[56] References Cited

U.S. PATENT DOCUMENTS

| | | | |
|---|---|---|---|
| 5,413,662 | 5/1995 | Skinner, III | 156/264 X |
| 5,439,542 | 8/1995 | Liebel | 156/250 X |
| 5,543,205 | 8/1996 | Liebel | 428/184 |

*Primary Examiner*—Curtis Mayes
*Attorney, Agent, or Firm*—Mark L. Berrier; Bernard A. Reiter

[57] ABSTRACT

A method and apparatus that utilizes a plurality of corrugated cardboard panels from shipping containers or other sources of used corrugated to make a laminated web is disclosed. The process begins with opening or flattening the used cardboard and then removing any end flaps or manufacturer's seams to form a plurality of panels. These panels may then be cut to specific shapes or uniform widths as necessary for different embodiments. A plurality of panels are then assembled end to end and face to face, using an overlapping arrangement and a suitable adhesive, to make a multiple thickness corrugated web. The panels may be overlapped or angled to improve the strength of the web. This multiple layer web can be wrapped with layers of paper or other suitable material to add strength, moisture resistance or other desired qualities. The paper layer can be used as a conveyor mechanism in the manufacture of the web, and can enable the manipulation and processing of the web and subsequent bonding with similar webs into a single web. The web can be used to form boxes and structural components and can be cut into desired shapes as necessary.

16 Claims, 5 Drawing Sheets

5,749,998

1

ASSEMBLY OF CORRUGATED PANELS INTO A WEB

RELATED APPLICATIONS

This application is a continuation-in-part of Ser. No. 08/031,669 filed Mar. 15, 1993, now U.S. Pat. No. 5,413,662. The disclosure of Ser. No. 08/031,669 is incorporated herein by reference.

FIELD OF THE INVENTION

This invention relates generally to recycling of cardboard boxes and to manufacturing flat thick corrugated sheeting, slabs or beams, from which furniture and other light structural items can be found. The invention is most particularly concerned with methods of reducing a variable starting material to a constant raw material and methods for assembly of the constant raw material into a finished product by tiling and sorting.

BACKGROUND AND PRIOR ART

Today there is a strong demand for pallets and other structural compound which are recyclable or are made from recycled materials. From a functional standpoint, the conventional wooden pallet is difficult to improve upon, but, when damaged or at the end of its life span (usually about five trips), disposal is difficult. Conventional pallets are bulky and take up a lot of landfill space; they cannot be burned easily because contaminants may have become embedded in them. If wooden pallets were made of standard modular sizes, recycling would be easier, but goods are not made with the sizing of pallets in mind. A specific weight range/cost range/durability range of nonstandard pallet size is required for many goods. The market is filled with a great many and great variety of pallets not at the end of their wear span but also not very valuable.

Prior art U.S. Pat. Nos. 4,230,049, 4,390,154, 4,467,728, 4,979,446, 5,076,176 and 5,083,996 to Horne, Ostler, Horne, Winebarger, Clasen and Smith, respectively demonstrate the existence of the problems in the industry. Each of these references is hereby fully incorporated by reference for all disclosed. The invention disclosed herein has the additional goal of recycling used material.

The Ostler patent discloses the use of a two-ply corrugated paperboard pallet deck and in which the use of the plies are arranged so that the corrugation in one ply is perpendicular to the corrugations in the other ply. Winebarger shows a corrugated pallet wherein each component of the pallet is constructed from creased and scored rectangular blanks molded to comprise a solid core of adjacent vertically oriented panels surrounded by an outer covering of parametric horizontally and vertically running panels. Clasen and Smith are both directed to pallet assemblies. The Clasen patent shows a low cost, structurally stable pallet or cargo shipping surface composed of elements which are made of layered and bonded cardboard material. The Smith patent discloses a disposable assembly using cylindrically reinforcing pieces which are engaged with stringer members. None of these references addresses the dual problems of economics and the environment.

Recycling is desirable both ecologically and economically, and in the future may actually be a requirement. Currently, landfills are 48% disposed paper. Of that fraction a substantial percentage is disposed corrugated board. Much corrugated board contains the maximum recycled content for its specific usage. The total number of trips a given volume of kraft paper obtains, even with recycling, is very low. A method of gaining additional use out of a given volume of corrugated between recycling trips will significantly affect the total volume of disposed corrugated that is landfilled.

While there is demand for products made of laminated corrugated cardboard, such as recyclable pallets, there are serious cost limitations imposed. It takes roughly 100 to 150 square feet of corrugated board to make a structural pallet which can withstand 1800 to 2500 pounds dynamic capacity. At $0.05/square foot for raw material costs are in the $5-7 range per pallet. This is equal to the finished cost range for new wooden pallets. Without a substantial cost improvement, corrugated pallets will never catch on. The invention provides for the cost efficient manufacture of corrugated pallets and makes them a practical means for shipping goods.

SUMMARY OF THE INVENTION

The invention comprises a method that utilizes a plurality of corrugated panels from used shipping containers to make a web that is then able to be cut into suitable shapes to be used in the construction of structured items such as shipping pallets. The process begins with opening and emptying the initial contents then flattening the used cardboard boxes and shipping them to a recycler. The process continues with removing the box end flaps and opening along the manufacturer's seams, and in some cases removing other irregularities such as folds, to form a plurality of sheets. These sheets are then cut to form a plurality of tiles which may have uniform widths and/or lengths as required by the arrangement of the tiles in the manufacturing process. A plurality of tiles are then assembled edge to edge and layered face to face, using a suitable adhesive, to make a multiple layer corrugated web. This multiple layer or laminated web can then be cut by using suitable cutting techniques to make structural components. These components can be wrapped with a layer or layers of paper, corrugated or other suitable material to add strength, moisture resistance or other desired qualities.

DESCRIPTION OF THE DRAWINGS

FIG. 14 is an illustration of a wide sheet of laminar web assembled from the interlocking tiled panel components of FIG. 13a.

DETAILED DESCRIPTION OF THE PREFERRED METHOD AND APPARATUS

The invention will now be described with reference to the accompanying figures. This invention discloses a process (FIGS. 1 and 1a) and assorted apparatus (FIGS. 2 through 8) for manufacturing a multi-layer cardboard web from recycled corrugated cardboard, bonded layer to layer. The web can then be cut into a structural component which can be assembled into end products such as heavy duty sheet or top deck, shipping pallets or furniture. Such a structural component, for example a beam to be used as a component of a shipping pallet, needs to withstand large forces downward upon the flutes (the strongest dimension of corrugated). The layers need to be adequately bonded layer-to-layer to avoid torsional failure. The laminar web built up from the bonded layers needs to have adequate gluing and spacing of joints so that it does not have areas of weakness (below a given standard) which would be invisible sources of failure. It needs to be built in a fixed thickness and in a continuous web which can be cut to appropriate length and height. Control over the variations in thickness are necessary to allow control over the gluing and notching process to form the final frame.

Figure 1A:
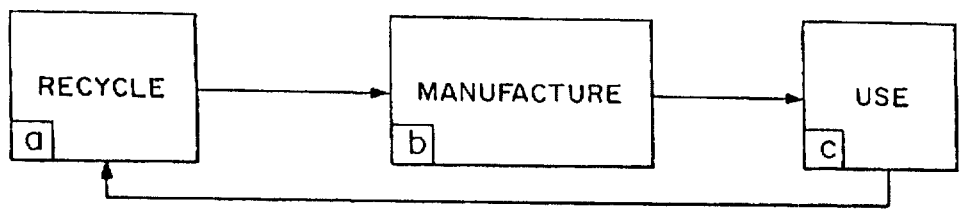
FIG. 1a is a flow diagram of the invention in broader perspective illustrating the recyclability of the product into raw material for further recycling.

As shown in FIG. 1a, and described elsewhere in this specification, new corrugated cardboard containers are currently flattened by the end user and returned to be recycled (by bailing milling and breakdown into pulp) into new containers. The rate of return/recycling is approximately 30%. This invention will increase the recyclability or return by an anticipated 30%.

The invention utilizes as raw material recycled corrugated cardboard, for example used cardboard boxes or shipping containers. The use of such material achieves the twin goals of recycling previously used cardboard to reduce landfill bound waste, and providing an inexpensive and thus cost competitive source of material. These twin goals are achieved at the cost of dealing with a highly variable material. Used corrugated boxes are typically a poor source of a fixed starting material. They are contaminated with case closing glues and tape. They are often torn, crushed or structurally damaged. Currently, they are crushed and bailed. Then they are shipped to a corrugated mill and ground up. Glue and contaminants are floated off in a wet separation process. Paper is then remade in a conventional paper making process. This invention solves the problem with a process step of gaining a fixed variable with which to start. The corrugated panels then can be recycled directly into another usage. When the components are finally damaged or used too badly for further use, they can be recycled as in FIG. 1a, from (c) to (a).

Figure 1:
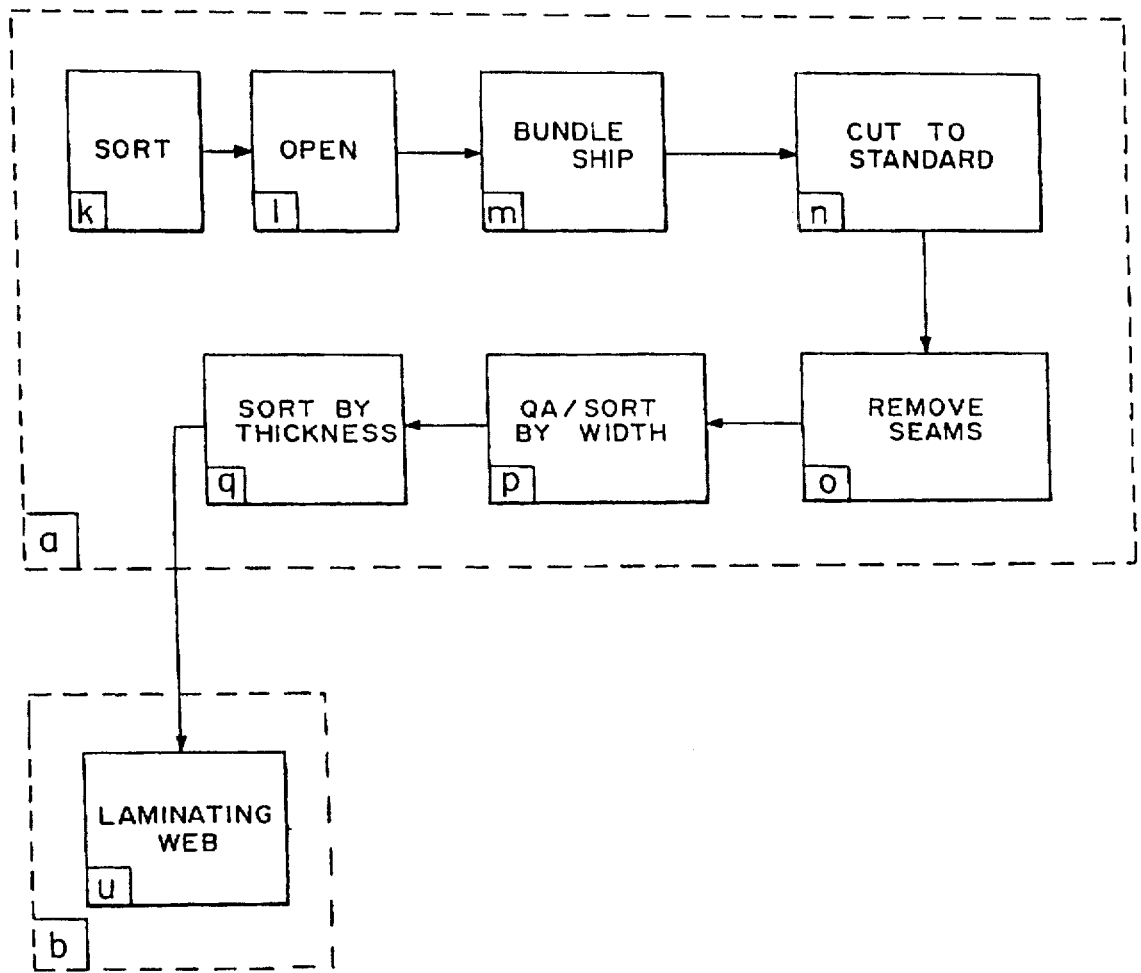
FIG. 1 is a flow diagram of the process steps of the invention.

Referring now to the figures, and specifically to FIG. 1, the process starts with corrugated boxes, as they are emptied at the user (grocery store etc.) and recycled (a). Irregularities such as the box flaps are separated to allow the box to be flattened or the box flaps are removed at the store to allow flat stacking. The box is either handled so as not to lose the structural integrity of the board or an initial sorting step (k) is used to select suitable boxes. Flattened (l) and strapped on a pallet (m), the boxes are shipped to the facility for manufacture (b) of product and then on to the end user (c). Some variation in these initial steps is possible, for instance the flattened boxes may initially appear at a recycler for certain steps and then be transferred to a web manufacturer.

Figure 2:
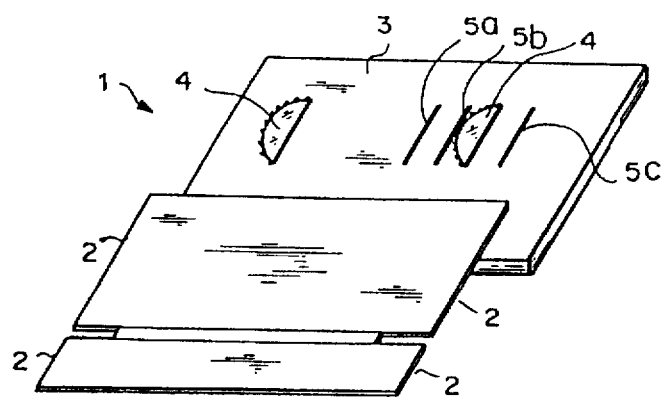
FIG. 2 is an illustration of an apparatus for the step of cutting the recycled corrugated component to standard length panels.

Referring to step (n) of FIG. 1 and to FIG. 2, a parallel slitter machine 1 is used to remove irregularities such as both top and bottom flaps 2 and leave the sidewalls. The apparatus illustrated provides a table surface 3 for handling the boxes and two parallel cutting tools 4, which are rotating circular saws in this primary embodiment. Other cutting implements or machine configurations may also be suitable. If the corrugated is to become an edge-on structural beam it is important to remove irregularities like all of the slots for or folds of the flaps 2. This would not be as important if making a wide multi-ply sheet. Removing the flaps 2 also eliminates much tape, label and glue contamination.

The slitter machine table 3 is provided with adjustments for the distance between the two saws. In the table illustrated one saw is fixed and the other adjustable to fit within openings 5a 5b 5c through the table top. The adjustment can be by any suitable means, in the invention disclosed it is envisioned that the adjustable cutter can be mounted to a foot pedal control for actuation an extruding retracting mechanism to allow quick adjustment. The purpose of the adjustment provision is to allow for the cutting of several fixed width of fixed length panels, for example 12", 15", 18", 21" to standardize the panels, or tiles, for use in making the webs.

Figure 3:
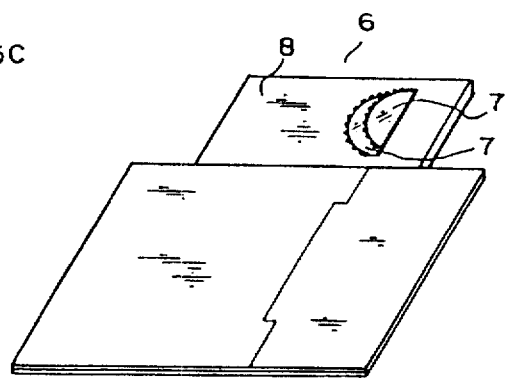
FIG. 3 is an illustration of an apparatus for the step of removing irregularities from the panels cut in FIG. 2.

Next, as shown in FIG. 3, other irregularities such as manufacturer's seams are removed from the panels manually or by a double blade saw 6 or other suitable device. This is step (o) of FIG. 1. The apparatus 6 illustrated provides two rotating circular saws 7 mounted on an arm 8 to make a perpendicular cut removing the manufacturers seam, turning the belt or band shape (from a box with the flaps removed in the previous step) into a flat sheet. The manufacturers' seam may be removed from the box while the adjacent sidewalls are either unfolded (relative to each other) as shown in FIG. 3, or folded on the seam. As shown in FIGS. 2 and 3 the cuts made by the saw 6 are perpendicular to those of saw 1 and leaves a panels of a fixed preselected widths or lengths, and variable thickness.

Figure 4:
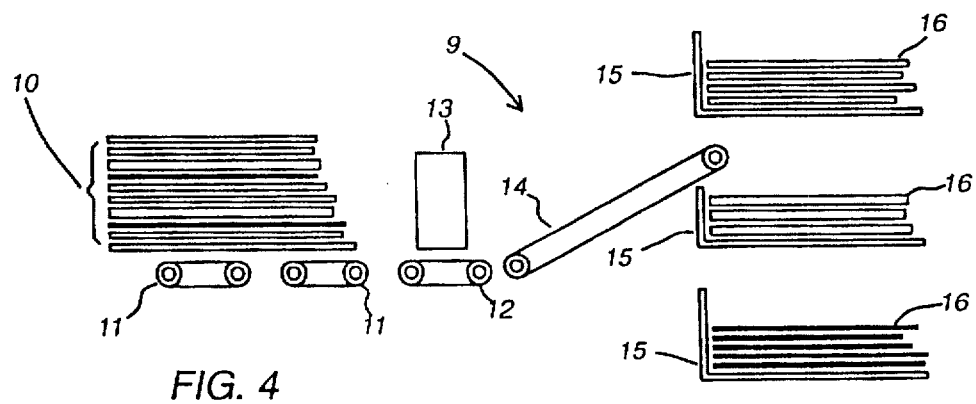
FIG. 4 is an illustration of an apparatus for the step of sorting the panels by thickness.

Manual or automatic inspection and sorting at this point (FIG. 1 steps (p) and (q), FIG. 1 and FIG. 4) provides a more constant starting raw material for the manufacturing line to be described below. Sidewalls of boxes are generally in better condition and can be segregated for more demanding applications by manual inspection or appropriate automated scanning. FIG. 4 illustrates an apparatus 9 for sorting the panels 10 by thickness. The relative thickness of panels 10 in any given layer should be relatively constant to avoid bridging weakness leading to failures. Bridging weaknesses occur when a thick sheet butts to a thin sheet forcing the next layer to bridge over the height variation. FIG. 4 depicts the unsorted stock 10 which is carried to the thickness sorting apparatus 9 by rollers 11 or other means such as conveyers (not shown). These rollers may be gravity driven or powered depending upon the dictates of the manufacturing line of any given facility. The roller 12 is situated below a thickness sensor or measuring device 13 which by microprocessor or other means orients a conveyor 14 to deposit each panel to a storage bin 15 for a given thickness within a given tolerance range.

The recycling step (a) of FIG. 1 is complete upon the deposit of the thickness-sorted panels of constant width 16 into the bins 15. Providing this much improved, though variable, starting material is the first step, in the broad view, of this invention, as is removing as much variation as possible from this raw material. See FIG. 1a, step (a), and FIG. 1, step (a), and steps (k) through (q).

Referring now to FIG. 1a, step (b), FIG. 1, step (u) and to FIGS. 5 through 8, the manufacturing of the laminated web will be described. The corrugated panels prepared in the previous steps are glued in a continuous web of variable thickness. The final thickness of the web must be controlled. There must be sufficient overlap of the panels in one layer over joints in any adjacent layer to avoid forming an internal weakness within the web. Depending on the type of glue, the amount of compression and duration under compression is important to the process design, but these variables can be selected to achieve the manufacturing goals and design strengths needed by means known in the art.

Figure 5:
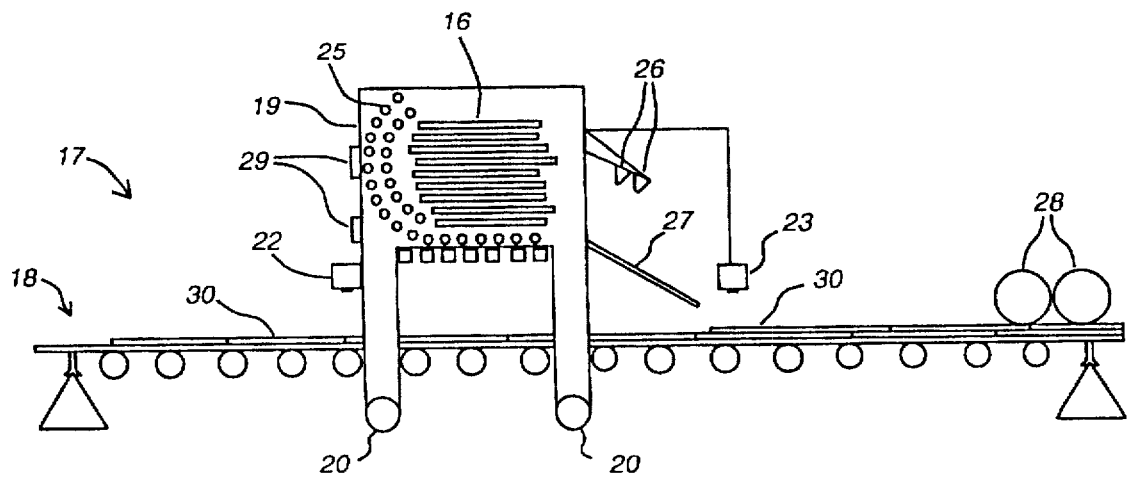
FIG. 5 is an illustration, in cross-section, of a first embodiment of an apparatus for the step of laying the panels into a laminar web.
Figure 6:
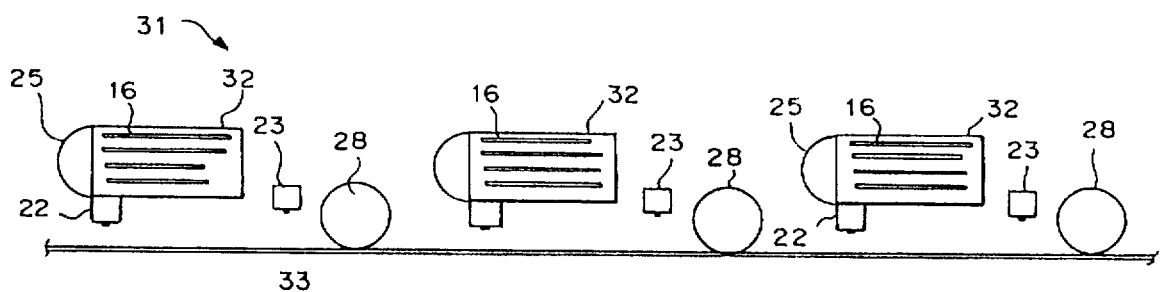
FIG. 6 is an illustration a second embodiment of an apparatus for the step of laying the panels into a laminar web.

Although improvements might be realized by further automation, which is considered to be within the scope of the present invention, the preferred enabling embodiment of the present invention for manufacturing a web on a continuous-production machine will now be described. Several alternative embodiments are disclosed. FIGS. 5 and 6, items 17 and 31. FIG. 1, step (u).

Referring to FIG. 5, a conveyor 18 is used to lay down a first layer of panels 16. The panels may be dispensed from a stationary dispenser at one point on the conveyor assembly (see FIG. 6), or from a moving dispenser or trolley 19 which can move up and down the length of the conveyor. If a wide web is to be produced, the trolley can move along the width of the conveyor (see FIG. 10). The panel dispenser has a supply of panels, such as a bin. The dispenser may also have sensors 22, 23 to detect the edges of panels.

Each layer of corrugated which is laid by the dispenser comprises a series of panels produced in accordance with the preceding disclosure. In the preferred embodiment, these panels are laid edge-to-edge with the adjacent panels along the length of the conveyor (i.e. the length of the web). The panels may also be placed together edge-to-edge along the width of the conveyor so that a web which is wider than the greatest dimension of any single panel can be formed.

A top view of a layer of corrugated panels is shown in FIGS. 15 a–d. FIGS. 15 a–d and 16 a–c are shown with the length of the web running horizontally and the width of the web being vertical. FIG. 15a shows a single row of panels laid edge-to-edge along the length of the conveyor. FIG. 15b shows a layer used in the manufacture of a wide web. This figure shows that the panels can be laid both along the web's length and across its width. FIG. 15c shows a layer formed by placing panels (here strips) of corrugated at a non-right angle to the length of the web. FIG. 15d shows a layer formed of panels which are placed at an angle to the length of the web and which do not reach across the entire width of the web. The panels of FIG. 15d form what is commonly referred to as a herringbone pattern. The panel arrangements of FIG. 15c and FIG. 15d provide advantages which will be discussed below and the arrangement of FIG. 15c is considered to be the preferred arrangement. The panel arrangements of FIG. 15c and FIG. 15d may be placed in side-by-side relation with other panels to form a layer for a wide web in the same manner as the arrangement of FIG. 15a is placed side-by-side with other panels to form the wide layer of FIG. 15b.

Once a first layer has been laid, a second layer can be laid on top of it. Adjacent layers are adhered to each other. The adhesive can be applied to either the first layer or the second, and can be applied as the panels are dispensed or after the first layer is laid. In the preferred embodiment, the adhesive is applied to the panels by glue guns 26 as the panels are dispensed. The layers are then pressed together using, for example, roller presses 28 as shown in FIG. 5. In the preferred embodiment, vacuum presses are utilized because they provide more even application of pressure on the layers and suffer less rebound of the layers after pressing. When a vacuum press is used, the use of one or more sheets of paper around the web improves the seal and the operation of the press. The sheets of paper may also be replaced by strips of tape which cover the joints between panels or by sheets of single-face corrugated. The layers may be pressed together after only two layers have been joined, or after more than two layers have been adhered together.

Figure 15A:
FIGS. 15 a–d are illustrations of panel arrangements which can be used in individual layers of the laminated web.
Figure 15C:
Figure 15B:
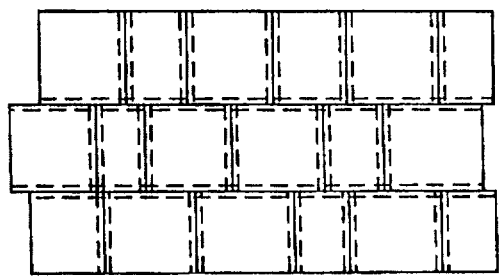
Figure 15D:
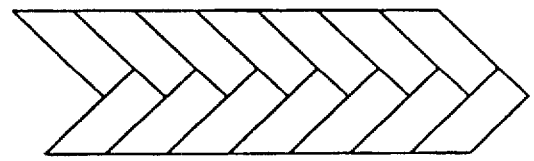

In the process of laying a subsequent layer on a preceding layer, care must be taken to avoid placing the panels such that two parallel edge-to-edge joints overlap. If two such joints are allowed to overlap, the resulting laminated web is substantially weaker at the overlapped joints than it is at points where joints are adjacent to, and strengthened by, a solid piece of corrugated. In placing panels for consecutive layers, it is therefore important to prevent the edges of panels from falling within what can be termed a "prohibited zone" around a joint in the preceding layer. The prohibited zones are shown in FIGS. 15a and 15b as dotted lines around each joint in the layer. The placement of the panels of upper layers may take into account the prohibited zones of more than one prior layer so that the web has even greater structural integrity. Likewise, if less structural integrity is required, the prohibited zones may be decreased or allowed to occur with a limited frequency.

While FIG. 15a shows a single-panel-width web, the same holds true for multiple-panel-width ("wide") webs and in fact, wide webs additionally have lengthwise joints which should not be overlapped by parallel joints. Although the prohibited zones of the lower layers of FIGS. 16 a–b are not shown, it can be seen that the joints of the upper layer are offset to avoid the prohibited zones. If consecutive layers utilize panel arrangements which place their joints at substantial angles to each other (i.e. they are not parallel), then there are no prohibited zones (see FIGS. 10, 16).

In the preferred embodiment, sensors 22 and 23 detect the edges of the panels and thereby identify the prohibited zones on the lower layer. Sensors 24 within the panel dispenser identify the length of the panels to be dispensed and determine whether the next panel will have an edge falling within a prohibited zone. If this is the case, the panel will either be trimmed to a length which will not violate a prohibited zone, or the panel will be returned to the top of the bin and the next panel will be checked for proper length.

Figure 10:
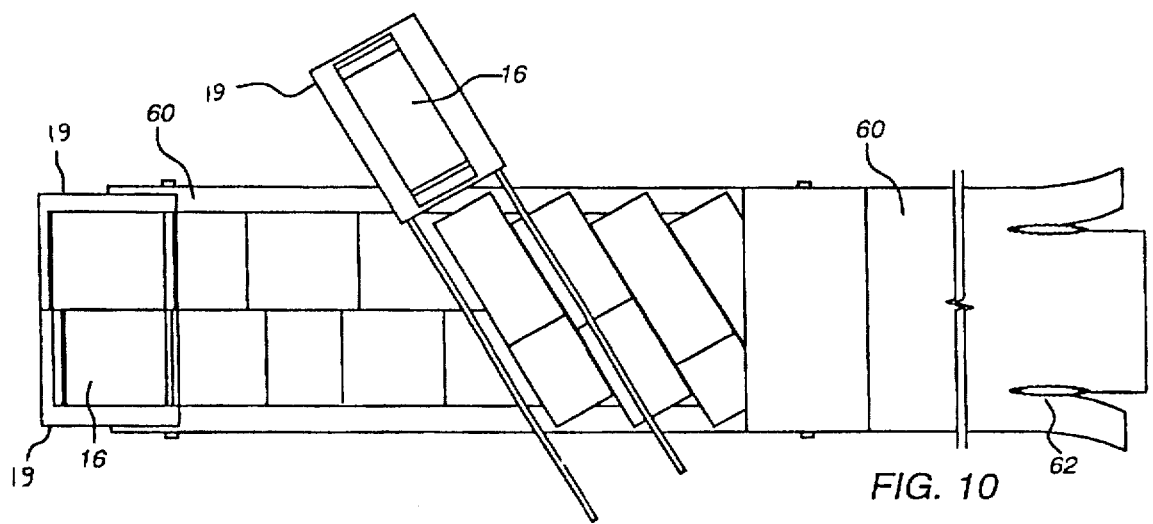
FIG. 10 is an illustration of a top view of an apparatus for producing a wide laminated web.

As noted above, because it is desirable to prevent parallel joints from overlapping, it is beneficial to use panel arrangements which do not have any parallel joints. For example, if the first layer is formed from panels laid as shown in FIG. 15b, the subsequent layer may be formed by placing panels in a similar arrangement, but where the angle of the panels in the second layer is the opposite of the angle of the panels in the preceding layer or by using alternating layers of angled and non-angled panels as shown in FIGS. 10 and 16. Such a situation is shown in FIGS. 10 and 16. If the panels of consecutive layers are angled with respect to each other, the flutes of the corrugation will typically also be angled so that the strength of the web is increased. The angled placement of the panels or strips as shown in FIG. 15c also carries with it the advantage that the strips may be of any width.

In addition to forming a web from corrugated panels which are placed in end-to-end abutting relation, the invention contemplates the formation of a web from a continuous strip of corrugated panels. This strip is continuous in the sense that the individual panels which are described above are joined together to form a continuous strip before the strip is used to manufacture a laminated web.

Figure 12:
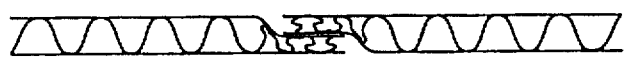
FIG. 12 is an illustration of lap joint which is flattened to the width of the overlapping panels.
Figure 16A:
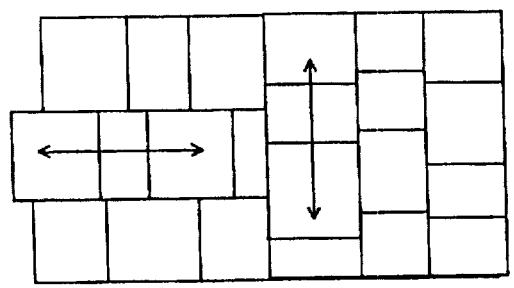
FIGS. 16 a–c are illustrations of panel arrangements of adjacent layers of the laminated web.
Figure 16B:
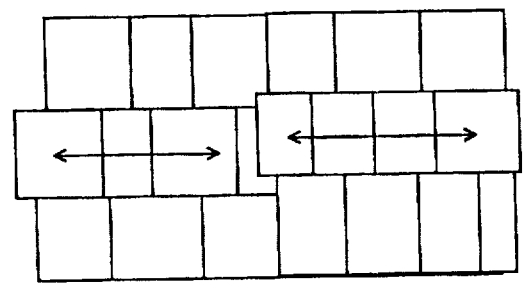
Figure 16C:
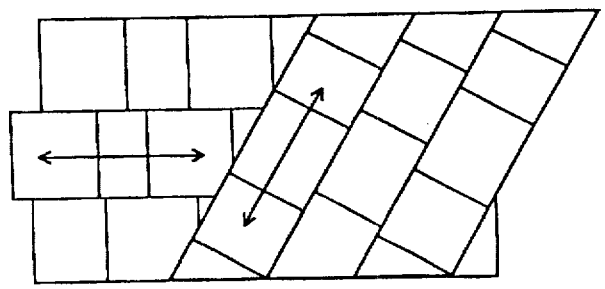

In this embodiment of the invention, a series of individual panels which are sorted by thickness prior to being joined together are joined by overlapping and gluing together the ends of consecutive panels to form a "lap" joint. The lap joint is then crushed so that the thickness of the strip is substantially constant. See FIG. 12. The strip is also trimmed to have a constant width. The strip can then be used to form a web by any of the methods disclosed herein. By using this strip to manufacture the web, it is not necessary to determine whether any end-to-end joint will fall within a prohibited zone. The strip is simply trimmed as needed. While the strip may be used in the manufacture of any of the embodiments of the web disclosed herein, it is envisioned to have the greatest application in the embodiments in which the strip is disposed across the width of the web as shown in FIGS. 15c, 16a and 16c. The strip may also be placed lengthwise along the web instead of being laid across its width and it is contemplated that any joint in the laminated web may be formed as a lap joint.

The layering of the panels and construction of the web may be done automatically or manually, and numerous variations on combinations of manual and automated steps during the laminating of the web will be apparent to those of skill in the art in view of this disclosure, all are considered to be within the scope of the invention.

Because the web is built up from several layers of corrugated panels, each of which may vary in thickness, the overall thickness of the completed web may vary considerably. If a web were laid up by a number of layers, for example 8, thickness might easily vary by 10–25% and up to 50%. Even though rough sorting of the panels will control this problem somewhat and make the job easier, constraints as to tolerances on the overall thickness of the web may require a supply of over-thick or over-thin panels to select the final layers' thicknesses to arrive at the specified size within the specified tolerance. The panels are sorted by the step and device of FIG. 4 and thus it is possible to use specific thickness for any given layer to arrive at the desired end thickness. Multiple bins 21 can be mounted to the trolley as shown in FIG. 5 (or to the dispensers shown in FIG. 6) and specific thicknesses selected for each layer, or bins could be interchanged to apply the selected thickness for each layer.

FIGS. 10, 14 and 16a through 16c illustrate variations of the invention, for manufacturing a wide sheet laminated web. After a wide layer such as is shown in FIG. 15b is laid down, another such layer is laid on top of it. This upper layer can be laid as a series of rows of panels with each row extending along the length of the web (FIG. 16b) or with the rows extending across the web (FIG. 16a). In both instances, care must be taken to avoid placing joints within the prohibited zones of the lower layer as described above. The importance of avoiding these prohibited zones, again as discussed above, is substantially decreased, if not eliminated, by forming the upper layer with its joints at an angle, rather than parallel to those of the lower layer (FIG. 16c). Again, many combinations of the described panel arrangements will be apparent to those of skill in the art in light of the disclosure herein.

Figures 13, 13A:
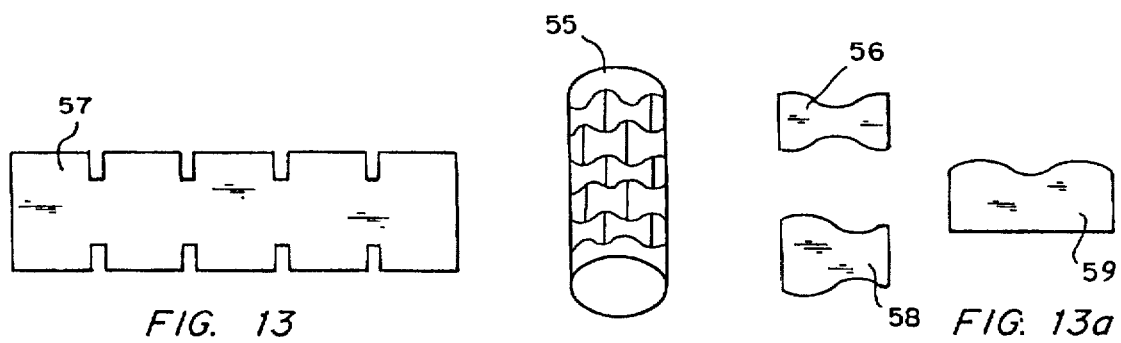
FIG. 13 is an illustration of an apparatus for forming an interlocking panel shape from the recycled corrugated components.
FIG. 13a is an illustration of shaped or tiled interlocking panel components formed by the apparatus of FIG. 13.
Figure 14:
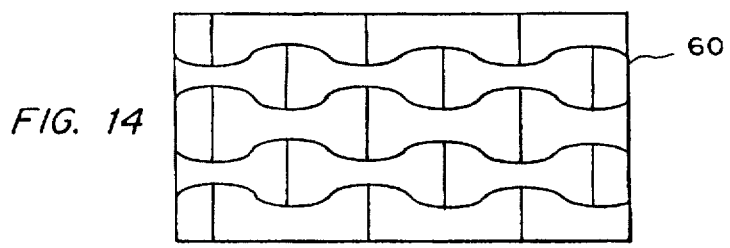

FIG. 13 and FIG. 13a illustrate an apparatus 55 for fashioning an interlocking shaped tile or panel 56 from the flattened used corrugated shipping containers 57. A single sheet flattened box 57 is run through a die roller 55 which cuts the sheet into puzzle like interlocking shapes 56, 58, 59. Although a specific "hourglass" shape 56 is illustrated this is for illustrative purposes only. The interlocking tiles or hourglass shapes are sorted so that only complete figures 56 remain and partial figures 58, 59 are discarded. The tiles are then used with the previous described apparatus and process steps to form a laminar web from the interlocking tiles as desired. FIG. 14 illustrates a web assembled from the tiles and trimmed (as further described below) to form a rectangular panel or beam.

Figure 7:
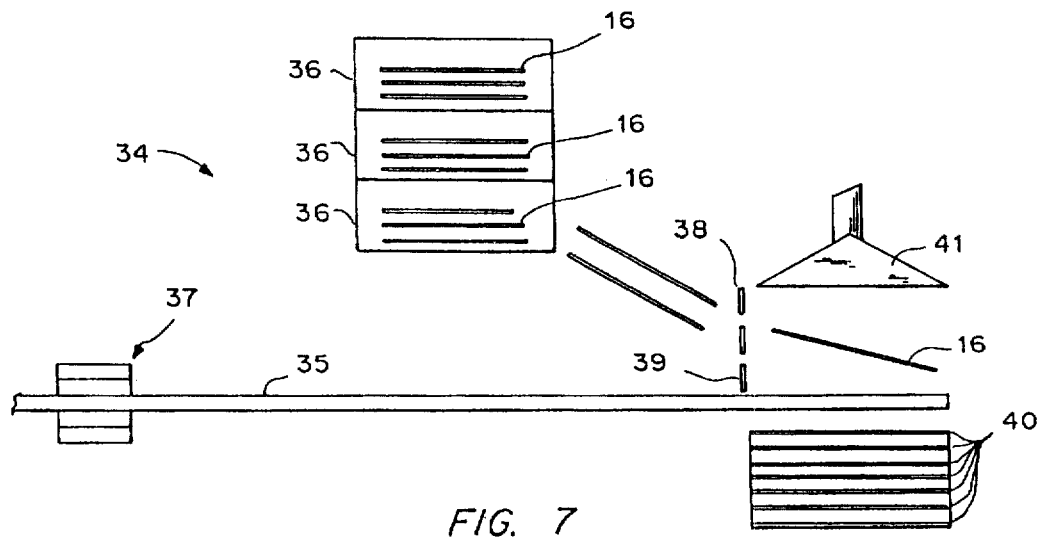
FIG. 7 is an illustration of an apparatus for the step of adjusting the thickened laminar web constructed by the apparatus of FIGS. 5 or 6 to a specified thickness.

FIG. 7 illustrates a final lay station 34 to measure the thickness of the web 35 and adjust if necessary to specification out of multiple bins 36 of varying thickness panels. A thickness sensor 37 provides a reading used to select the appropriate panel to make up the correct product. Sorted panels 16 are stored in the bins 36. Glue guns and dispensing are done as with previous described apparatus of the invention. A shear 38 is provided to trim panel lengths as needed and a shear or cutting device 39 cuts the web into segments of the length desired. Press 41 is provided to achieve the proper bond of the last adjusting layer from this final lay station 34.

Figure 8:
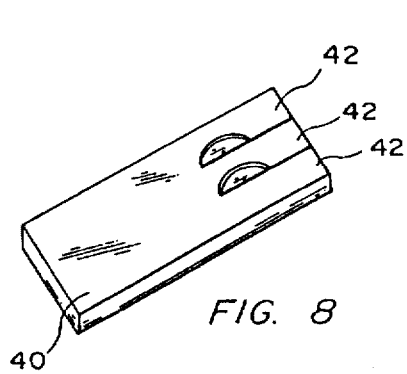
FIG. 8 is an illustration of an apparatus for cutting the continuous laminar web into beams.

After the finished web (or cut web segments) is allowed to cure as previously described, it may be slit or sawn to form the height (vertical) dimension of a beam. This can be done as in FIG. 8 with multiple simultaneous cuts. FIG. 8 illustrates a web segment 40 being run through a double bladed saw similar to that described in previous figures to form completed beams 42.

Figure 9:
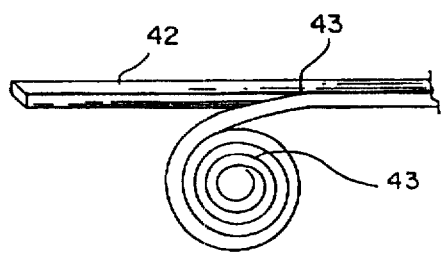
FIG. 9 is an illustration of the step of overwrapping the beams formed by the apparatus of FIG. 8.

An additional step shown in FIG. 9, which would strengthen the web or a beam which is cut from the web, would be to wrap the web or beam in a layer of paper or corrugated 43 with an overlap joint. This can be done prior to assembly of the panels into a web, or as part of the conveyor apparatus, or as a finishing step. The exterior of this sheet could be treated to retard moisture absorption if needed for a particular application. Wrapping with a single sheet provides additional protection against bonding and delamination/torsion failures within the web. As a further step, a sheet of corrugated could be wrapped around the web or a structural member cut from the web. This is achieved with a wrapping machine which will vary the score lines with the varying thickness of the web. This could be used as a means to strengthen the web or to control variations in thickness.

Figure 11:
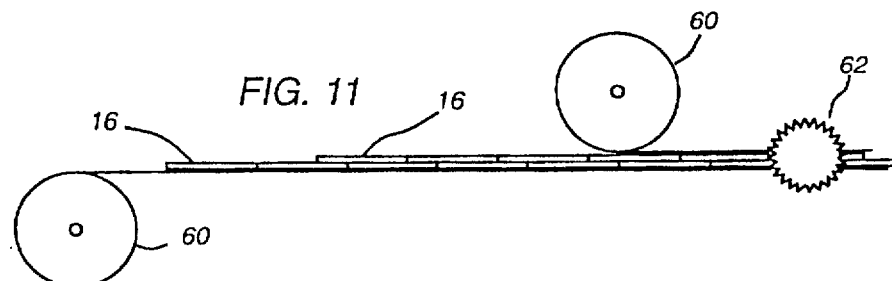
FIG. 11 is an illustration of a side view of a laminated web during its manufacture.

The sheet of paper which may be used in the manufacture of the web can provide processing advantages as well as the structural advantages disclosed above. Because of the difficulty of maintaining the alignment of a conveyor belt to transport the panels and the web during manufacture, it is advantageous to use a paper roll as the conveyor belt as shown in FIGS. 10 and 11. The corrugated panels are adhered to the paper 60 as it comes off the roll and additional layers are added as needed to form the desired web. An additional sheet can be used to improve the operation of a vacuum press (not shown in FIGS. 10 and 11). At the end of the manufacturing process, the web and the paper sheet are simply cut to the desired width by saws 62 and are cut to a desired length if necessary.

Because the alignment of the paper is maintained, the speed of the web through the manufacturing apparatus can be increased beyond that which can be achieved by an ordinary conveyor belt system. Additionally, the paper layer serves to hold the web together while allowing it to flex to a certain degree. The web can therefore be manipulated during the manufacturing process to achieve even further advantages. For example, two webs can be manufactured side-by-side, by layering layers of cardboard on separate roll paper conveyors and then rotating the two webs and joining them together. This arrangement effectively doubles the speed of the manufacturing process and at the same time allows for faster and more even curing of the adhesive between layers. This process also allows the finished web or individual layers to be partially perforated (by perforating one or more of the two webs and then joining them together), wrapped around a mandrel to form boxes or tubes, and manipulated in numerous other ways to improve the manufacture of finished products from the web.

The foregoing disclosure and description of the invention is illustrative and explanatory thereof, and various changes in the details of the illustrated construction and sequence of the steps may be made without departing from the spirit of the invention.

I claim:

1. A process for manufacturing a laminated cardboard web comprising the steps of:
   (a) laying a first series of cardboard panels edge to edge, said first series of panels extending in a first direction;
   (b) laying a second series of cardboard panels edge to edge on top of said first series, said second series of panels extending in said first direction, said panels of said second series being laid so that the edge to edge joints between said panels of said second series are angled with respect to the edge to edge joints between said panels of said first series; and
   (c) bonding said first series of panels to said second series of panels.

2. The process of claim 1 wherein one of said series of panels forms a herringbone pattern.

3. The process of claim 1 wherein said second series of panels is formed by cutting from a continuous strip of cardboard a section sufficiently long to span the width of said first series of panels, the next panel in said second series being formed by cutting another section from said continuous strip of cardboard, said continuous strip of cardboard being formed by joining a plurality of cardboard panels together by overlapping and bonding the ends of said panels and crushing said overlap joint to essentially the same thickness as said panels.

4. The process of claim 1 further comprising laying at least one additional series of panels edge to edge with said first series of panels, said additional series disposed perpendicular to said first direction from said first series of panels, said second series of panels overlapping said first series of panels and said additional series of panels.

5. The process of claim 4 wherein said second series of panels comprises more than one series of panels laid edge to edge in both said first direction and in said direction perpendicular to said first direction.

6. A process for manufacturing a laminated cardboard web comprising the steps of:
   (a) laying a first layer of cardboard panels, said first layer comprising at least one series of said panels, each series being laid edge to edge in a first direction, each series further being placed in edge to edge relation with any adjacent series;
   (b) laying a second layer of said panels on top of said first layer, said second layer comprising at least one series of said panels placed in edge to edge relation in said first direction and in the direction perpendicular to said first direction;
   (c) bonding said first layer of panels to said second layer of panels.

7. The process of claim 6 wherein the edge to edge joints of said panels are orthogonal to the edge to edge joints of adjacent layers and wherein those of said edge to edge joints in adjacent layers which are parallel are arranged in non-overlapping fashion.

8. The process of claim 7 wherein each of said series of panels in said second layer is laid in a direction parallel to said first direction.

9. The process of claim 7 wherein each of said series of panels in said second layer is laid in a direction perpendicular to said first direction.

10. The process of claim 6 wherein said series of panels in said second layer are laid with edge to edge joints being angled with respect to the edge to edge joints of said panels of said first layer.

11. A process for manufacturing a laminated cardboard web comprising the steps of:
   (a) laying a first series of cardboard panels in an unbridged configuration;
   (b) laying at least one additional series of cardboard panels in an unbridged configuration, said additional series of panels being disposed in face-to-face relation with said first series of panels, said panels of at least one of said first and additional series having one or more edge portions which are overlapped with said edge portions of adjacent panels in said series and which are crushed so that the thickness of said series at said edge portions is equal to the thickness of the remainder of said series; and
   (c) bonding said first series of panels to said additional series of panels.

12. The process of claim 11 wherein said panels of said additional series are bonded together at their overlapped edge portions.

13. A process for manufacturing a laminated cardboard web comprising the steps of:
   (a) laying a first layer of cardboard panels edge to edge;
   (b) laying a second layer of cardboard panels edge to edge in contact with said first layer;
   (c) placing a layer of a material in contact with at least one of said layers of cardboard panels, the step of placing a layer of material in contact with at least one of said layers of cardboard panels being achieved by using a roll of paper as a conveyer upon which said layer of cardboard is transported;
   (d) bonding said layers of cardboard and material together.

14. The process of claim 13 wherein said layers of cardboard are laid on a plurality of roll paper—conveyors, and wherein said layers of cardboard laid on said roll paper conveyors are adhered together in face to face relation to form a single laminated web.

15. The process of claim 14 wherein at least one of said layers of cardboard laid on one of said roll paper conveyors is perforated prior to being bonded with another of said cardboard layers laid on another of said roll paper conveyors.

16. The process of claim 13 wherein said layer of cardboard laid on said roll paper conveyor is wrapped around a mandrel to form a laminated cardboard structure.

* * * * *